(12) United States Patent
Kumra et al.

(10) Patent No.: US 11,143,422 B2
(45) Date of Patent: Oct. 12, 2021

(54) ALL-IN-ONE EVAPORATIVE COOLER

(71) Applicant: Jmatek (Zhongshan) Ltd., Zhongshan (CN)

(72) Inventors: Naresh Kumra, Zhongshan (CN); Huoxi Zhou, Zhongshan (CN); Yi Pu, Zhongshan (CN)

(73) Assignee: Jmatek (Zhongshan) Ltd., Zhongshan (CN)

( * ) Notice: Subject to any disclaimer, the term of this patent is extended or adjusted under 35 U.S.C. 154(b) by 264 days.

(21) Appl. No.: 16/521,363

(22) Filed: Jul. 24, 2019

(65) Prior Publication Data

US 2020/0278123 A1   Sep. 3, 2020

(30) Foreign Application Priority Data

Mar. 1, 2019  (CN) .......................... 201910155654.4

(51) Int. Cl.
*F24F 6/16* (2006.01)
*F24F 13/28* (2006.01)

(52) U.S. Cl.
CPC ................ *F24F 6/16* (2013.01); *F24F 13/28* (2013.01); *F24F 2221/02* (2013.01); *F24F 2221/12* (2013.01)

(58) Field of Classification Search
CPC .......... F24F 6/16; F24F 13/28; F24F 2221/02; F24F 2221/12; F24F 2013/205; F24F 13/20; F24F 6/12; F24F 5/0035; Y02B 30/54; F04D 29/4226; F21V 33/0092; F21V 33/0096; F21Y 2115/10
See application file for complete search history.

(56) References Cited

U.S. PATENT DOCUMENTS

| | | | | | |
|---|---|---|---|---|---|
| 4,698,188 | A | * | 10/1987 | Gutmann | ................ F24F 6/043 261/107 |
| 4,913,713 | A | * | 4/1990 | Bender | .................... B67D 1/06 222/146.6 |
| 5,111,529 | A | * | 5/1992 | Glucksman | ............. F24F 6/025 392/394 |
| 2009/0000325 | A1 | * | 1/2009 | Johnson | .................. F24F 6/043 62/259.4 |

(Continued)

FOREIGN PATENT DOCUMENTS

CN   208296154 U  * 12/2018

*Primary Examiner* — Emmanuel E Duke
(74) *Attorney, Agent, or Firm* — Wang Law Firm, Inc.

(57) ABSTRACT

The present disclosure discloses an all-in-one evaporative cooler. The all-in-one evaporative cooler comprises a fan with an air duct and a humidifier with water vapor outlets, wherein the water vapor outlets are communicated with the air duct, the humidifier and the fan are detachably connected, and the fan and the humidifier can respectively independently work after separated. The all-in-one evaporative cooler provided by the present disclosure simultaneously has three functions, namely a humidifying function, a blowing function and a cooling function, and is formed by assembling the humidifier and the fan which can respectively independently work. The independent humidifier and the independent fan have a small size so as to be convenient to carry, and a combination of the humidifier and the fan also has a small size so that arrangement, carrying and function selection are convenient and the diversified requirements of users can be met.

9 Claims, 5 Drawing Sheets

(56) References Cited

U.S. PATENT DOCUMENTS

2012/0222548 A1\* 9/2012 Lev .......................... F24F 6/12
  95/1
2015/0338702 A1\* 11/2015 Xie ................... G02F 1/133512
  349/106

\* cited by examiner

ALL-IN-ONE EVAPORATIVE COOLER

TECHNICAL FIELD

The present disclosure relates to an all-in-one evaporative cooler, which simultaneously has three functions, namely a humidifying function, a blowing function and a cooling function.

BACKGROUND

Currently, a humidifier, a fan and an evaporative cooler on the market mainly are single-function products or multifunctional products which integrate the humidifier, the fan and the evaporative cooler. The customers require single-function products and multifunctional products; however, the costs of the customer and the arrangement space will be increased by adopting the single-function products, and the multifunction products which integrate the humidifying, blowing and cooling functions usually have a relatively larger size so that the requirements of the customers on the single-function products cannot be greatly meet.

SUMMARY

An objective of the present disclosure is to provide an all-in-one evaporative cooler in order to overcome the deficiencies in the prior art.

In order to achieve the above objective, the present disclosure provides the following technical schemes.

Embodiments of the present disclosure disclose an all-in-one evaporative cooler, comprising:

a fan with an air duct; and a humidifier with water vapor outlets, wherein the water vapor outlets are communicated with the air duct, the humidifier and the fan are detachably connected, and the fan and the humidifier can respectively independently work after separated.

Preferably, in the all-in-one evaporative cooler, the humidifier is arranged below the fan.

Preferably, in the all-in-one evaporative cooler, the water vapor outlets are formed between the fan and the humidifier.

Preferably, in the all-in-one evaporative cooler, a handle is mounted on a shell of the fan.

Preferably, in the all-in-one evaporative cooler, the handle is rotationally connected with the shell of the fan.

Preferably, in the all-in-one evaporative cooler, a filter screen assembly is arranged at an air inlet of the air duct.

Preferably, in the all-in-one evaporative cooler, a filter screen is arranged at an air intake of the humidifier.

Preferably, in the all-in-one evaporative cooler, an essential oil box is arranged at the air intake of the humidifier.

Preferably, in the all-in-one evaporative cooler, a blower and atomizing pieces are sequentially arranged between the air intake of the humidifier and the water vapor outlets, and the humidifier further comprises a secondary battery for providing power for the blower and the atomizing pieces.

Preferably, in the all-in-one a evaporative cooler, an annular LED light bar is fixed to the bottom end of the fan, an annular transparent insert is formed at the top end of the humidifier, an annular light-transmission groove is formed between the fan and the humidifier after the fan and the humidifier are assembled, the transparent insert is located on the inner side of the light-transmission groove and matches with the inner side of the shell of the fan, and the LED light bar corresponds to the top of the transparent insert Compared with the prior art, the present disclosure has the advantages:

the all-in-one evaporative cooler simultaneously has three functions, namely a humidifying function, a blowing function and a cooling function, and is formed by assembling a humidifier and a fan which can respectively independently work; the independent humidifier and the independent fan have a small size so as to be convenient to carry, and a combination of the humidifier and the fan also has a small size so that its arrangement, carrying and function selection are convenient and the diversified requirements of users can be met.

BRIEF DESCRIPTION OF THE DRAWINGS

To describe the technical schemes of the embodiments of the present disclosure or the prior art more clearly, the accompanying drawings required for describing the embodiments of the present disclosure or the prior art are briefly described. Apparently, the accompanying drawings in the following description show merely some embodiments of the present disclosure, and a person of ordinary skill in the art may still derive other drawings from these accompanying drawings without creative efforts.

DESCRIPTION OF THE EMBODIMENTS

The present disclosure will be more completely understood through the following detailed description, which should be read in conjunction with the attached drawings. Detailed embodiments of the present disclosure are disclosed herein, however, it is to be understood that the disclosed embodiments are merely exemplary of the present disclosure, which may be embodied in various forms. Therefore, specific functional details disclosed herein are not to be interpreted as limiting, but merely as a basis for the claims and as a representative basis for teaching one skilled in the art to variously employ the present disclosure in virtually any appropriately detailed embodiment.

Figure 1:
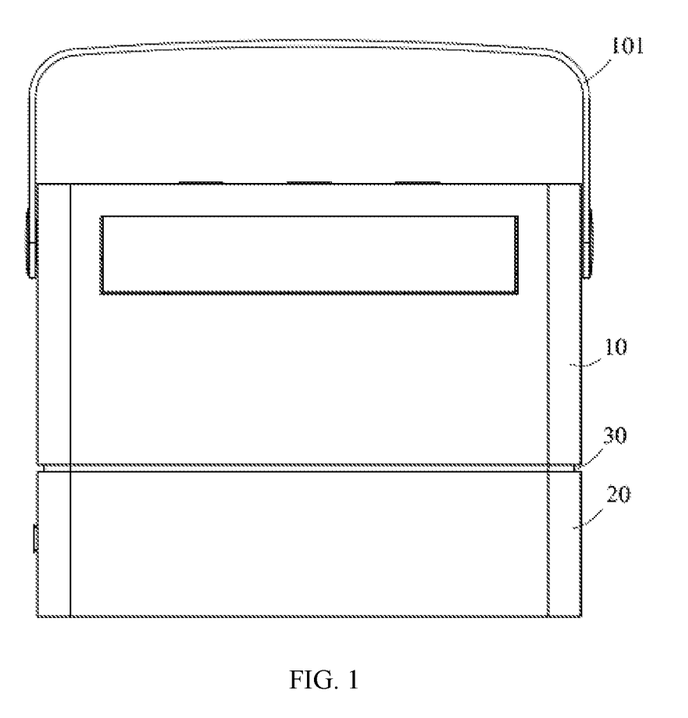
FIG. 1 is a structural schematic diagram of an all-in-one evaporative cooler after being assembled in specific embodiments of the present disclosure.

As shown in FIG. 1, in one embodiment, an all-in-one evaporative cooler is provided, which comprises a fan 10 and a humidifier 20 which are stacked up and down, wherein water vapor outlets of the humidifier 20 are communicated with an air duct of the fan 10.

The fan 10 and the humidifier 20 respectively are units which can work independently, and the both are detachably assembled up and down.

In the technical scheme, after the fan 10 and the humidifier 20 are separated, the both can independently achieve a fan function and a humidifying function; and after the fan 10 and the humidifier 20 are assembled, water vapor generated by the humidifier 20 enters the air duct of the fan 10 to cool the air, so an evaporative cooler function can also be achieved.

Therefore, it can be seen that the evaporative cooler has three functions, namely a blowing function, a humidifying function and a cooling function so as to be a three-in-one evaporative cooler and provide diversified options for users.

Furthermore, the fan 10 comprises a handle 101, and the two ends of the handle 101 are respectively rotationally connected with the two sides of a shell of the fan 10.

In the technical scheme, the whole body of the fan or the evaporative cooler can be conveniently transported through the handle.

Obviously, in order to facilitate transportation, the exterior of the shell of the fan 10 may also be fixed with a handle or sunken to form a recess.

In some embodiment, rollers may also be arranged at the bottom of the humidifier 20 so as to help the evaporative cooler to be pushed away integrally.

In some embodiment, the fan 10 and the humidifier 20 may be arranged in parallel; and in some embodiment, the humidifier 20 may also be arranged above the fan 10.

Figure 2:
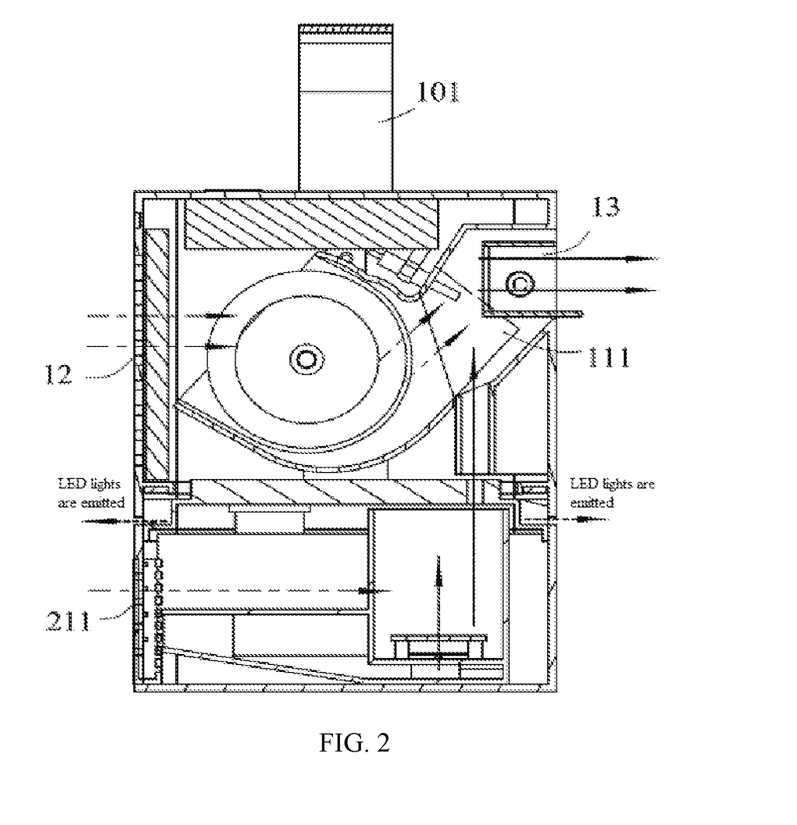
FIG. 2 is a side cutaway view of the all-in-one evaporative cooler after being assembled in specific embodiments of the present disclosure.
Figure 3:
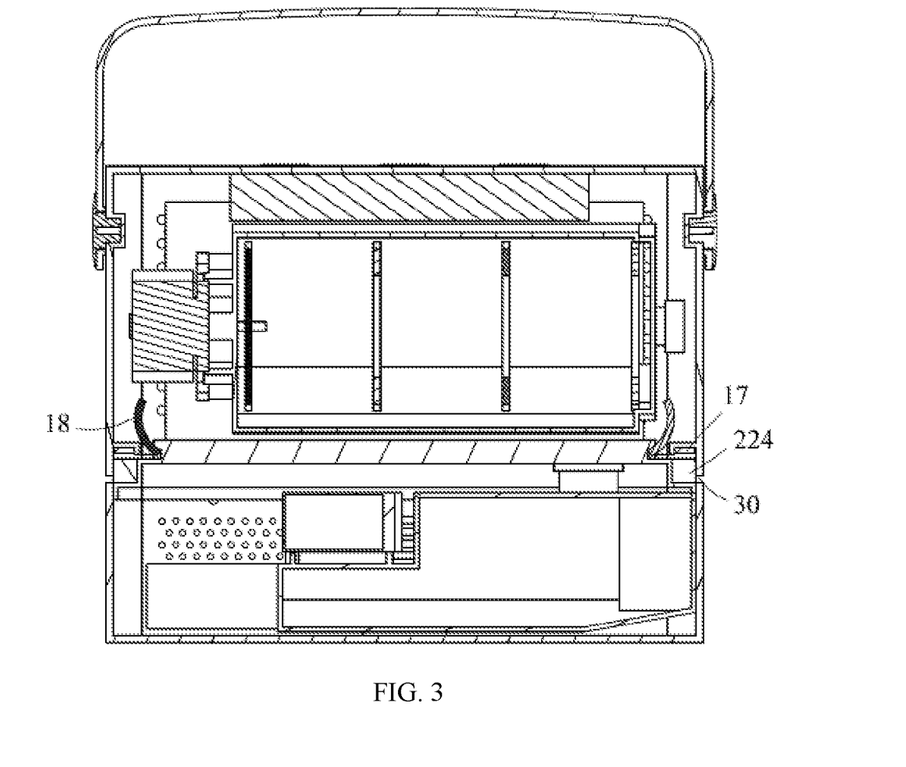
FIG. 3 is a front cutaway view of the all-in-one evaporative cooler after being assembled in specific embodiments of the present disclosure.
Figure 4:
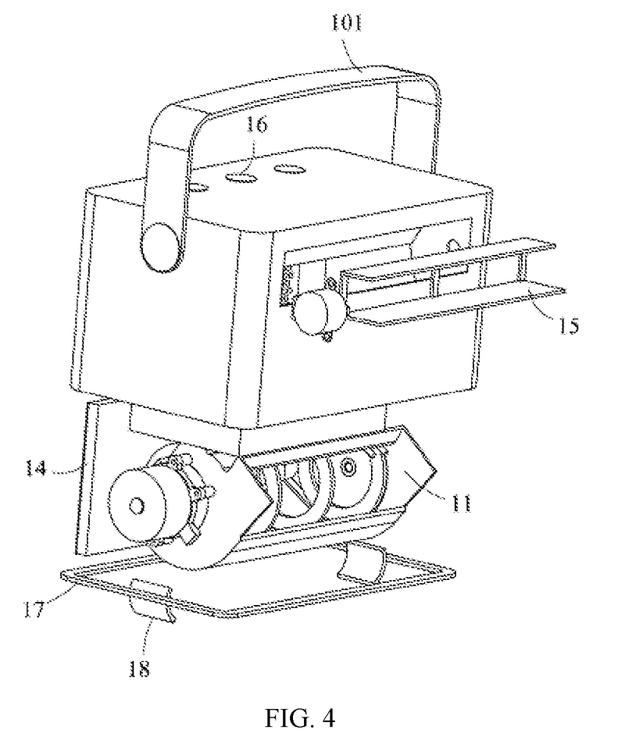
FIG. 4 is a stereoscopic decomposition schematic diagram of a fan in the specific embodiments of the present disclosure.

As shown in FIG. 2, FIG. 3 and FIG. 4, the fan 10 comprises a first blower 11, an air duct 111 is formed in the first blower 11, and an air inlet 12 and an air outlet 13 are respectively formed in the shell of the fan 10 corresponding to the two ends of the air duct 111.

The first blower 11 preferably uses a cross-flow fan with tender air supply and low noise, the fan 10 may be adjusted at three gears, and its gear may be regulated according to requirements.

In one embodiment, the air inlet 12 and the air outlet 13 are formed on the opposite two sides of the fan 10.

Furthermore, a filter screen assembly 14 is arranged between the air inlet 12 and the first blower 11.

In the technical scheme, the filter screen assembly 14 may utilize an activated carbon screen, a HEPA filter cloth and the like and is mainly used for filtering dusts, impurities such as contaminants and the like in the air.

Furthermore, an air deflector assembly 15 is arranged at the air outlet 13.

In the technical scheme, the air deflector assembly 15 is used for controlling the air direction of the air outlet 13, can achieve a swing-flap mode and a fixed-angle mode and can regulate an air guiding angle according to requirements.

In one embodiment, the air deflector assembly 15 comprises a stepping motor, air deflectors, left and right swinging blades and the like, and the stepping motor may be used for driving the left and right swinging blades to swing.

Furthermore, a plurality of control buttons 16 are arranged at the top surface of the shell of the fan 10 and can control on/off of a power supply, the working mode (namely air volume, and the swinging of the swinging blades) and the like.

In other embodiments, the control of the fan 10 may further utilize a wireless remote control manner, a touch panel manner and the like.

Furthermore, the fan 10 further comprises an LED light bar 17, the LED light bar 17 is annular, is fixed to the bottom end of the fan 10 and is located between the fan 10 and the humidifier 20, and during working, the LED light bar 17 emits lights all around.

In the technical scheme, the LED light bar may exert decorating and illuminating functions. In one embodiment, the LED light bar may automatic start when the fan works in order to exert a working state indicating function.

Furthermore, an adaptive interface (which is not shown in the accompanying drawings) is formed in one side of the fan 10, and through the adaptive interface, the fan 10 may be connected with the outside mains supply so as to provide working power for the first blower.

In other embodiments, through the adaptive interface, the fan 10 may also be connected with an external rechargeable battery.

In one embodiment, the interior of the fan 10 may also be provided with a rechargeable battery such as a lithium ion battery and the like.

In one embodiment, the interior of the fan 10 may also be provided with a negative ion generator (which is not shown in the accompanying drawings).

Figure 5:
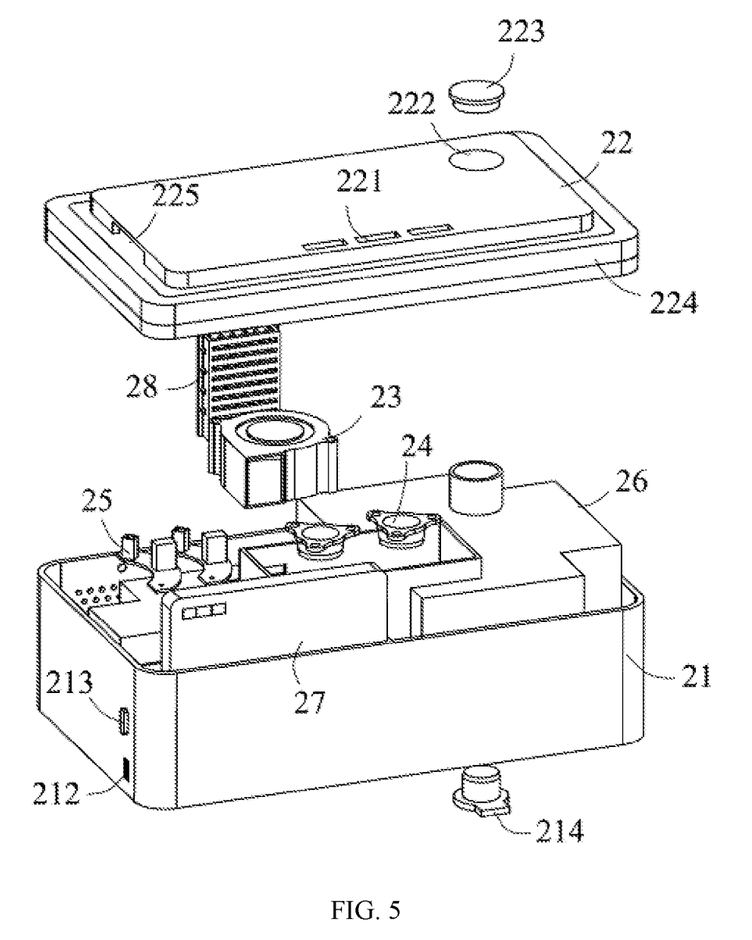
FIG. 5 is a stereoscopic decomposition schematic diagram of a humidifier in the specific embodiments of the present disclosure.

As shown in FIG. 2, FIG. 3 and FIG. 5, the humidifier 20 comprises a housing 21 and a top cover 22, the top cover 22 covers a top-end opening of the housing 21, thereby forming an enclosed mounting cavity. The interior of the mounting cavity is provided with a second blower 23, atomizing pieces 24, a control panel 25, a water box 26 and a secondary battery 27.

An air intake 211 is formed in one side of the housing 21, water vapor outlets 221 are formed in the top cover 22, and the second blower 23 and the atomizing pieces 24 are sequentially arranged between the air intake 211 and the water vapor outlets 221.

The secondary battery 27 is a rechargeable battery, preferably a lithium ion battery; and the secondary battery 27 is used for providing power for the control panel 25, the atomizing pieces 24, the second blower 23 and the like. A charging interface 212 electrically connected with the secondary battery 27 is formed in one side of the housing 21.

In one embodiment, the secondary battery may supply power of 5V or 12V and may utilize the rechargeable battery in order to be convenient to use on the desk or use outdoors.

A control button 213 electrically connected with the control panel 25 is arranged on one side of the housing 21, and after the control button 213 is turned on, the power supply is on so that the humidifier starts working.

Furthermore, a water filling nozzle 222 and a water outlet are respectively formed in the top cover 22 and the bottom end of the housing 21, and a water filling plug 223 and a waterproof plug 214 respectively seal the water filling nozzle and the water outlet.

Furthermore, an essential oil box and a filter screen 28 are further arranged between the air intake 211 and the second blower 23. Different essential oil may be added to the essential oil box according to personalized requirements. The filter screen may utilize an activated carbon screen, a HEPA filter cloth and the like and is mainly used for filtering dusts, impurities such as containments and the like in the air.

As shown in FIG. 3 and FIG. 5, the edge of the top end of the top cover 22 forms an annular transparent insert 224, an annular light-transmission groove 30 is formed between the fan 10 and the humidifier 20 after the fan 10 and the humidifier 20 are assembled, the transparent insert 224 is located on the inner side of the light-transmission groove 30 and matches with the inner side of the shell of the fan, and the LED light bar 17 corresponds to the top end of the transparent insert 224.

In the technical scheme, light rays generated by the LED light bar 17 penetrate through the transparent insert 224 downwards and then are emitted all around through the transparent insert 224 and the light-transmission groove 30.

In the present disclosure, the transparent insert 224 not only can be taken as a limiting device to achieve the matching with the shell of the fan, but also can allow the outward emission of the light rays of the LED light bar. The LED light bar may be contained in the bottom end of the shell of the fan so as to be greatly protected and fixed.

As shown in FIG. 3 and FIG. 4, in order to achieve the detachable connection between the fan 10 and the humidifier 20, two pressing dampers 18 may be arranged at the bottom end of the fan 10, and clamping slots 225 are formed in the top end of the humidifier 20 and match with the pressing dampers 18.

During assembling, the fan 10 is aligned to the humidifier 20, and the transparent insert 223 is inserted into the bottom end of the shell of the fan 10 and is continuously pressed down in order to achieve the matching locking between the pressing dampers and the clamping slots.

In one embodiment, the detachable connection between the fan and the humidifier may further be achieved by arranging a snap joint manner on the exterior of the shell. In one embodiment, the matching connection between the fan and the humidifier may be achieved by transversely sliding matched clamping strips and clamping slots.

In conclusion, the all-in-one evaporative cooler provided by the present disclosure can achieve three working states:

(1) An Evaporative Cooler State the fan and the humidifier are assembled up and down; and in use, the fan and the humidifier are turned on, the LED light bar emits light rays all around, the humidifier atomizes water by the atomizing pieces (in an ultrasonic manner), the second blower blows water vapor into the air duct of the fan, a part of the water vapor is evaporated at the air outlet to cool down the air, and the other part of the water vapor is blown out of the air outlet with the air so that wet low-temperature air is blown out of the air outlet.

(2) An Individual Fan State after the fan and the humidifier are separated, the fan can independently work; and in use, the air enters the air inlet and passes through the filter screen assembly, and due to operation of blower impellers and the negative ion generator, clean and healthcare air with negative ions is blown out of the air outlet.

(3) An Individual Humidifier State after the fan and the humidifier are separated, the humidifier can independently work; and in use, the water filling plug is firstly pulled out, water is filled through the water filling nozzle, the water filling plug is plugged after the water filling is complete, the humidifier is turned on, the atomizing pieces atomize the water to form water vapor, meanwhile, air enters the essential oil and the filter screen, and then due to operation of the blower, the air is blown out with the water vapor. Different essential oil or mosquito-control liquid may be added to the essential oil box according to personalized requirements. When the humidifier is not used, the waterproof plug may be pulled out to drain residual water in the water box in order to prevent bacteria from breeding and prevent water from leaking during transportation.

The aspects, embodiments, features, and examples of the present disclosure are to be considered illustrative in all respects and are not intended to limit the present disclosure, the scope of which is defined only by the claims. Other embodiments, modifications, and usages will be apparent to those skilled in the art without departing from the spirit and scope of the claimed present disclosure.

The use of headings and sections in the application is not meant to limit the present disclosure; each section can apply to any aspect, embodiment, or feature of the present disclosure.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be anyone of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

It is to be understood that the figures and descriptions of the present disclosure have been simplified to illustrate elements that are relevant for a clear understanding of the present disclosure, while eliminating, for the purpose of clarity, many other elements. Those of ordinary skill in the art will recognize that such elements and other elements are desirable. However, because such elements are well known in the art, and because they do not facilitate a better understanding of the present disclosure, a discussion of such elements is not provided herein. The disclosure herein is directed to all such variations and modifications to such elements and methods known to those skilled in the art. It should be understood that the drawings are for illustration purpose, but not as construction of the drawings. The saved details and modification or replacements fall within the scope of those skilled in the art.

It should be understood that a single component may be replaced with a plurality of components and a plurality of components may be replaced with the single component in order to provide one element or structure or to carry out one or a plurality of given functions in specific aspects of the present disclosure. Besides the replacement is not carried out to practice the specific embodiments of the present disclosure, the replacement falls within the scope of the present disclosure.

While the present disclosure has been described with reference to illustrative embodiments, it will be understood by those skilled in the art that various other changes, omissions and/or additions may be made and substantial equivalents may be substituted for elements thereof without departing from the spirit and scope of the present disclosure. In addition, many modifications may be made to adapt a particular situation or material to the teachings of the present disclosure without departing from the scope thereof. Therefore, it is intended that the present disclosure not be limited to the particular embodiment disclosed for carrying out this present disclosure, but that the present disclosure will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. An all-in-one evaporative cooler, comprising:
a fan with an air duct; and
a humidifier with water vapor outlets, wherein the water vapor outlets are communicated with the air duct, wherein the humidifier and the fan are detachably connected, and the fan and the humidifier can respectively independently work after separated,
wherein an annular LED light bar is fixed to the bottom end of the fan, an annular transparent insert is formed at the top end of the humidifier, an annular light-transmission groove is formed between the fan and the humidifier after the fan and the humidifier are assembled, the transparent insert is located on the inner side of the light-transmission groove and matches with the inner side of the shell of the fan, and the LED light bar corresponds to the top of the transparent insert.

2. The all-in-one evaporative cooler according to claim 1, wherein the humidifier is arranged below the fan.

3. The all-in-one evaporative cooler according to claim 2, wherein the water vapor outlets are formed between the fan and the humidifier.

4. The all-in-one evaporative cooler according to claim 2, wherein a handle is mounted on a shell of the fan.

5. The all-in-one evaporative cooler according to claim 4, wherein the handle is rotationally connected with the shell of the fan.

6. The all-in-one evaporative cooler according to claim 1, wherein a filter screen assembly is arranged at an air inlet of the air duct.

7. The all-in-one evaporative cooler according to claim 1, wherein a filter screen is arranged at an air intake of the humidifier.

8. The all-in-one evaporative cooler according to claim 1, wherein an essential oil box is arranged at the air intake of the humidifier.

9. The all-in-one evaporative cooler according to claim 1, wherein a blower and atomizing pieces are sequentially arranged between the air intake of the humidifier and the water vapor outlets, and the humidifier further comprises a secondary battery for providing power for the blower and the atomizing pieces.

* * * * *